Sept. 25, 1956 A. E. ADLER 2,764,632

INTERCOMMUNICATION TELEPHONE SYSTEMS

Filed Oct. 9, 1952 2 Sheets-Sheet 1

INVENTOR.
Adolf E. Adler
By: Watson, Cole, Grindle & Watson ATTORNEYS

Sept. 25, 1956 A. E. ADLER 2,764,632

INTERCOMMUNICATION TELEPHONE SYSTEMS

Filed Oct. 9, 1952 2 Sheets-Sheet 2

INVENTOR
Adolf E. Adler
By: Watson, Cole, Grindle & Watson
ATTORNEYS

United States Patent Office 2,764,632

Patented Sept. 25, 1956

2,764,632

INTERCOMMUNICATION TELEPHONE SYSTEMS

Adolf Erwin Adler, London, England, assignor to Modern Telephones (Great Britain) Limited, London, England, a British company Application October 9, 1952, Serial No. 313,971

Claims priority, application Great Britain October 11, 1951

8 Claims. (Cl. 179—1)

Figure 1A:
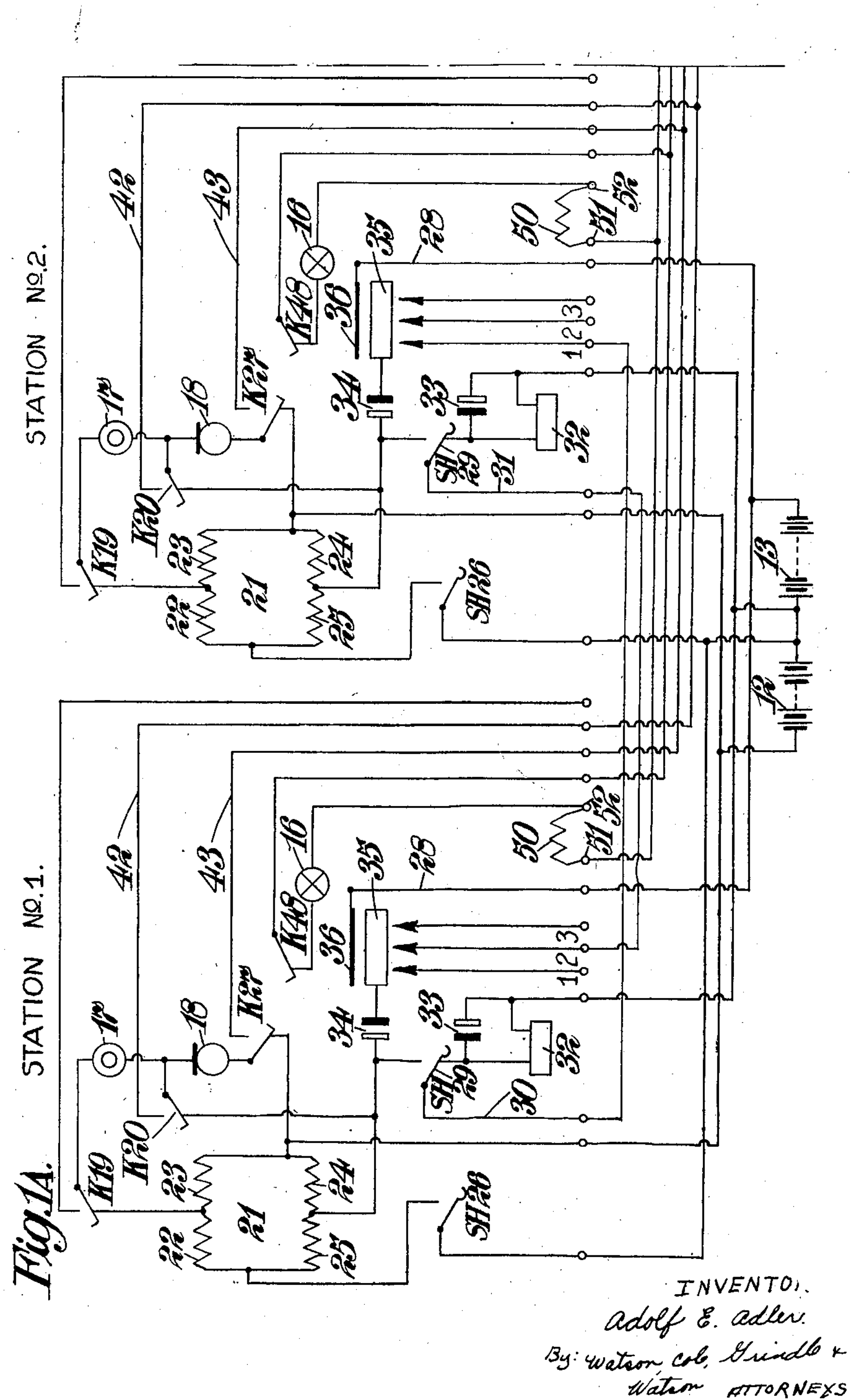
Figure 1B:
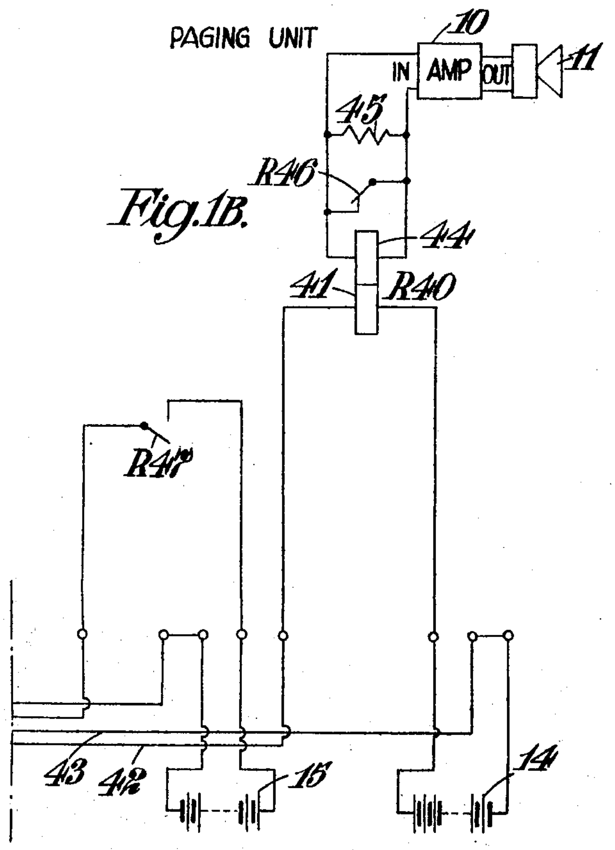

This invention relates to intercommunication telephone systems of the kind having separate speech circuits whereby a number of conversations may take place simultaneously between different pairs of stations and the invention has for its principal object to provide paging facilities enabling one or more of the stations to make paging calls through a loud-speaker paging unit.

According to this invention, in an intercommunication telephone system of the kind referred to, there is provided an amplifier coupled to a loud-speaker for paging, a speech circuit between the input to the amplifier and the intercommunication station or those intercommunication stations having paging facilities, and switch means at the station or each of said stations having paging facilities for connecting the telephone transmitter of the station to said speech circuit whereby a paging call over the loud-speaker may be made by speaking into the telephone transmitter.

In a system comprising two or more stations having paging facilities, there may be provided a relay, the operation of which is controlled by said switch means, the relay having contacts so arranged in circuits to indicator lamps at the stations having paging facilities that when the relay is energised by operation of the switch means at one of the stations, the lamps at the other stations are lit to indicate that the paging system is engaged.

In order that the indicator lamp should not be lit at the station where a paging call is being made, the indicator lamp at each station may be connected in series with a back contact of the switch means at the respective station. Thus operation of the switch means at any station to make a paging call will prevent the circuit for the lamp at that station being completed.

The aforementioned relay may be energised by direct current over said speech circuit and in this arrangement the relay coil may conveniently be arranged to form an inductive coupling to an input circuit to the amplifier.

Alternatively, a capacitive coupling may be provided between said speech circuit and the amplifier.

Conveniently, the switch means at each of the stations having paging facilities may be arranged, when operated, to connect the transmitter at that station in series with the speech lines, the relay coil at the paging unit and a battery or rectifier. The battery or rectifier can thus function both to energise the transmitter and to operate the relay.

Preferably said relay is provided with contacts arranged to prevent speech currents being applied to the amplifier unless the relay is energised by operation of said switch means at an intercommunication station. This helps to prevent any sound being emitted from the loud-speaker when the paging system is not in use. Conveniently this may be achieved by arranging said relay so that, when the relay is energised, contacts are opened which normally apply a short-circuit across the amplifier input terminals.

The following is a description of one embodiment of the invention, reference being made to the accompanying drawing which is a circuit diagram showing two stations of an intercommunication telephone system and a paging unit.

Referring to the drawing, there are shown two stations, labelled station No. 1 and station No. 2, forming part of an intercommunication telephone system and there is also shown a paging unit having an amplifier 10 and loudspeaker 11 which can be controlled by either of the stations No. 1 or No. 2. The stations Nos. 1 and 2 are referred to later as the controlling stations and as will be clearly apparent from the following description, the system may have any desired number of such controlling telephone stations similar to the two stations which are shown, these two stations merely being representative examples.

The batteries or rectifiers for supplying the various circuits are common to all the stations and comprise a talking battery 12 for the speech circuits between the controlling stations, a ringing battery 13 for the signalling circuits between the controlling stations, a speech battery 14 for the speech circuits to the paging unit and an engaged signal battery 15 for signalling lamps 16 at the controlling stations which indicate that the paging unit is engaged.

Each of the controlling stations has a receiver 17 and transmitter 18, which conveniently may be arranged in a handset, the receiver being connected through contacts K19 and K20 of a switch (referred to as switch K) to two diagonally opposite points of a bridge circuit 21 formed by four resistors 22, 23, 24, 25. The talking battery 12 is connected, through a normally open switch-hook contact SH26 to the other pair of diagonally opposite points of the bridge 19. One side of the transmitter 18 is connected to one side of the receiver 17 and is thus normally connected through contact K20 to one point on the bridge. The other side of the transmitter is connected through another contact K27 of switch K to that point on the bridge 21 which is connected to the negative terminal of the talking battery 12. The bridge is arranged so that it is balanced when the transmitter and receiver are in circuit, as is described in the specification of British Patent No. 650,070.

A set of push-buttons 28 are provided at each controlling station, of which in the drawing Nos. 1 and 2 at stations Nos. 2 and 1 respectively are connected for calling the other of these two stations. It will be understood that further similar stations may be connected in a similar manner to the two shown and the appropriate number of push-buttons would be provided corresponding to the number of stations.

A second switch-hook contact SH29 over its back contacts connects the home line (indicated by references 30 and 31 from stations Nos. 1 and 2 respectively) of the controlling station to one side of a buzzer 32 which is shunted by a condenser 33 for reducing interference with other lines from the buzzer. The other side of the buzzer is connected to the positive terminal of the ringing battery 13, which terminal is connected also to the positive terminal of the talking battery 12. The front contact of SH29 serves to connect the home line 30 or 31 to that point on the bridge circuit 21 which is also connected to both the transmitter and receiver. This point on the bridge is also connected through a condenser 34 to a speaking bar 35 through which, by operation of the appropriate one of the push buttons 28, connection may be established to the home line of any of the other controlling stations. The push buttons 28 have an overthrow position in which connection is made with a common ringing bar 36 which is connected to the negative terminal of the ringing battery 13. The push buttons are mechanically arranged so that, when they are released from the overthrow position, they remain locked in the normal thrown position, i. e. in contact with the speaking bar 35 until the handset is replaced whereupon the buttons are fully released.

The operation of the system for communication between the controlling stations is as follows: If one of the controlling stations wishes to speak to another, the handset at the calling station is lifted to prepare the speech circuits and the appropriate one of the push buttons 28 is pressed to the "overthrow" position. In this position the negative terminal of the ringing battery 13 is connected through the ringing bar 36 and the push button to the home line of the called station. At the called station the ringing circuit is completed from the home line through the back contacts of SH29 and the buzzer 32 to the positive terminal of the ringing battery 13 and thus the buzzer sounds. On lifting the handset at the called station, the buzzer circuit is interrupted by the opening of the back contacts of SH29 and the speech circuits are completed by the closing of the front contacts SH26 and SH29, the former connecting the talking battery 12 to the bridge circuit 21 and the latter connecting the home line of the called station to the bridge circuit. At the calling station, release of the push button leaves it in the normal thrown position, that is in contact with the speaking bar 35, and thus the speaking circuit is completed from the bridge circuit 21 of the calling station through condenser 34, speaking bar 35, push button, the home line of the called station and front contact SH29 of the called station to the bridge circuit of the called station. This form of speech circuit using bridge circuits at each station is described in the specification of the aforementioned British Patent No. 650,070 and reference may be made to that specification for a full description of the speech current paths through the bridge circuits.

The present invention is concerned more particularly with the paging unit and its connection to the controlling stations. At the paging unit there is provided a relay R40 having a low impedance operating coil 41 which is connected in series with the battery 14 by lines 42, 43 to the front contacts of K20 and K27 at each of the controlling stations. Thus if the switch K is operated at any of the controlling stations, a circuit is completed from one terminal of the battery 14 through the coil 41 of relay R40, line 42, contact K20, transmitter 18, contact K27, and line 43 back to the other terminal of the battery 14. This circuit is direct current circuit for energizing the relay R40 and also forms a speech circuit. The relay R40 also has a high impedance winding 44 in which the speech signals are induced when speech currents flow through the winding 41. The winding 44 is connected in shunt with a resistor 45 of low impedance and is also connected across the input terminals of the amplifier 10. The output terminals of the amplifier are connected to the loudspeaker 11 of the paging unit. The speech signals induced in the winding 44 are thus amplified and fed to the loud speaker.

The relay R40 has two contacts R46, R47 of which contact R46 is normally closed and contact R47 is normally open. Contact R46 is connected in shunt across the winding 44 so that this winding is short-circuited except when the relay is energised. This contact R46 thus helps to prevent any sound being emitted from the loud speaker when the paging system is not in use. The contact R47 of relay R40 closed when the relay is energised to complete a circuit from the battery 15 to the signal lamps 16 of the controlling stations over a further back contact K48 of the switches K at the controlling stations. Thus, when the relay R40 is energized, the signal lamps 16 will light at all the controlling stations except the one where the switch K has been operated.

The operation of the paging unit will have been clear from the foregoing description. When a controlling station wishes to make a paging call, the switch K at the controlling station is operated, so completing a circuit from the transmitter 18 through the low impedance winding 41 of the relay R40. The operation of this relay, by the closing of contact R47, causes the signal lamps 16 to light at all the other controlling stations, thereby indicating that the paging unit is engaged. Speaking into the transmitter 18 at that controlling station at which the switch K has been operated will induce speech currents in the winding 44 and these will be amplified by the amplifier 10 and fed to the loud speaker 11. At the end of the paging call, the switch K is restored to its normal position so interrupting the operating circuit for the relay R40 and the paging unit is thereby released for any further calls.

In a system with a number of stations having paging facilities, each station having an indicator lamp to show when the paging equipment is in use, there may be an appreciable voltage drop in the lines feeding the indicator lamps. In such cases it may be preferable to use a substantially higher battery or rectifier voltage and to fit a voltage dropping resistor at each station so that the voltage drop in the lines has less effect on the voltage at the lamps. Preferably therefore the telephone instruments are provided with a resistor 50 in the indicator lamp circuit, separate terminals 51, 52 having provided so that the connection from the paging unit is made either through the resistor or not, according as the circuit conditions require.

Conveniently also the telephone instrument is constructed so that it is suitable not only for use in a paging system as described above but is also suitable alternatively for use as an intercommunication instrument in an intercommunication system having a number of such instruments and also a loud-speaking master station. For such a system, the intercommunication station may require switch means for disconnecting the transmitter and receiver from the normal intercommunication speech circuits and for connecting them to a three-or four-wire circuit to the loud-speaking master and it may require an indicator lamp to indicate when the master station is calling. Conveniently the same switch K and indicator lamp 16 as described above for the paging system may be employed for the master station circuits when the instrument is used in conjunction with a loud-speaking master station. For this reason, the three contacts K19, K20 and K27 of switch K are made as change-over contacts so that the switch K can function to disconnect the transmitter and receiver from the bridge 21 and to connect them to a three-wire line.

I claim:

1. In an intercommunication telephone system comprising a plurality of telephone stations, each having a transmitter and receiver, and speech circuits between the stations with associated selector switches at the stations for enabling a number of conversations to take place simultaneously between different pairs of stations, the combination of an amplifier having an input and an output, a loudspeaker coupled to said amplifier output for paging, speech circuits between the amplifier input and said telephone stations, switch means at each of said stations for connecting the telephone transmitter of the station to the speech circuit leading to the amplifier input whereby a paging call over the loudspeaker may be made by speaking into the telephone transmitter, an indicator lamp at each of said stations, a relay with an energizing circuit arranged so that the relay is operated on operation of said switch means at any of said stations, and contacts on said relay arranged to control said lamps so that when the switch means is operated at one station, the lamps at the other stations are lit.

2. In an intercommunication telephone system comprising a plurality of telephone stations, each having a transmitter and receiver, and speech circuits between the stations with associated selector switches at the stations for enabling a number of conversations to take place simultaneously between different pairs of stations, the combination of an amplifier having an input and an output, a loudspeaker coupled to said amplifier output for paging, speech circuits between the amplifier input and certain predetermined telephone stations, switch means at each of said predetermined stations for connecting the telephone transmitter of the station to the speech circuit leading to the amplifier input whereby a paging call over the loudspeaker may be made by speaking into the telephone transmitter, an indicator lamp at each of said predetermined stations, a relay with an energizing circuit arranged so that the relay is operated on operation of said switch means at any of said predetermined stations, and contacts on said relay arranged to control said lamps so that, when the switch means is operated at one station, the lamps at at least all the other of said predetermined stations are lit.

3. In an intercommunication telephone system comprising a plurality of telephone stations, each having a transmitter and receiver, and speech circuits between the stations with associated selector switches at the stations for enabling a number of conversations to take place simultaneously between different pairs of stations, the combination of an amplifier having an input and an output, a loudspeaker coupled to said amplifier output for paging, speech circuits between the amplifier input and said telephone stations, switch means at each of said stations having front and back contacts, the front contacts being arranged for connecting the telephone transmitter of the station to the speech circuit leading to the amplifier input whereby a paging call over the loudspeaker may be made by speaking into the telephone transmitter, an indicator lamp at each of said stations connected in series with the back contacts of the switch means at the respective station, a relay with an energizing circuit arranged so that the relay is operated on operation of said switch means at any of said stations, and contacts on said relay arranged to control said lamps so that when the switch means is operated at one station, the lamps at all the other stations are lit but not the lamp at the station where said switch means are operated.

4. In an intercommunication telephone system comprising a plurality of telephone stations, each having a transmitter and receiver, and speech circuits between the stations with associated selector switches at the stations for enabling a number of conversations to take place simultaneously between different pairs of stations, the combination of an amplifier having an input and an output, a loudspeaker coupled to said amplifier output for paging, speech circuits between the amplifier input and said telephone stations, switch means at each of said stations for connecting the telephone transmitter of the station to the speech circuit leading to the amplifier input whereby a paging call over the loudspeaker may be made by speaking into the telephone transmitter, an indicator lamp at each of said stations, a relay associated with the amplifier and having direct current energizing circuits including at least parts of the speech circuits between the telephone stations and the amplifier input, said energizing circuits including said switch means so that the relay is energized by direct current over at least part of the speech circuit from a station on operation of said switch means at the station, and contacts on said relay arranged to control said lamps so that, when the switch means is operated at one station, the lamps at the other stations are lit.

5. In an intercommunication telephone system as claimed in claim 4 and wherein the relay has an operating coil connected in the speech circuits from the telephone stations, an inductive coupling coil coupling the amplifier input to the relay operating coil for applying the speech signals to the amplifier.

6. In an intercommunication telephone system comprising a plurality of telephone stations, each having a transmitter and receiver, and speech circuits between the stations with associated selector switches at the stations for enabling a number of conversations to take place simultaneously between different pairs of stations, the combination of an amplifier having an input and an output, a loudspeaker coupled to said amplifier output for paging, speech circuits between the amplifier input and said telephone stations, a relay associated with the amplifier and having an operating coil, a direct current power supply source, switch means at each of said stations arranged for connecting the telephone transmitter of the station into a circuit loop including the speech circuit to the amplifier, the relay operating coil and said direct current power supply source whereby operation of said switch means at any of the stations functions both to energize the transmitter at that station and complete the transmitter circuit to the amplifier and to operate the relay, an indicator lamp at each of said stations, and contacts on said relay arranged to control said lamps so that, when the switch means is operated at one station, the lamps at the other stations are lit.

7. In an intercommunication telephone system comprising a plurality of telephone stations, each having a transmitter and receiver, and speech circuits between the stations with associated selector switches at the stations for enabling a number of conversations to take place simultaneously between different pairs of stations, the combination of an amplifier having an input and an output, a loudspeaker coupled to said amplifier output for paging, speech circuits between the amplifier input and said telephone stations, switch means at each of said stations for connecting the telephone transmitter of the station to the speech circuit leading to the amplifier input whereby a paging call over the loudspeaker may be made by speaking into the telephone transmitter, an indicator lamp at each of said stations, a relay with an energizing circuit arranged so that the relay is operated on operation of said switch means at any of said stations, contacts on said relay arranged to control said lamps so that, when the switch means is operated at one station, the lamps at the other stations are lit, and further contacts on said relay arranged to prevent speech currents being applied to the amplifier unless the relay is energized by operation of said switch means at one of the stations.

8. The combination as claimed in claim 7 wherein said further contacts are arranged, when closed, to short circuit the amplifier input and wherein the relay is arranged to open said further contacts when the relay is energized.

References Cited in the file of this patent

UNITED STATES PATENTS

| | | |
|---|---|---|
| 1,272,641 | Egerton | July 16, 1918 |
| 1,586,554 | Goodrum | June 1, 1926 |
| 1,938,709 | Massoneau | Dec. 21, 1933 |
| 2,226,891 | Baker | Dec. 31, 1940 |
| 2,366,552 | Paust | Jan. 2, 1945 |
| 2,496,629 | Lamberty et al. | Feb. 7, 1950 |